(12) United States Patent
Hallstrom

(10) Patent No.: US 8,689,735 B2
(45) Date of Patent: Apr. 8, 2014

(54) HANDLING OF TEAT CUPS

(75) Inventor: Anders Hallstrom, Vendelso (SE)

(73) Assignee: DeLaval Holding AB, Tumba (SE)

( * ) Notice: Subject to any disclaimer, the term of this patent is extended or adjusted under 35 U.S.C. 154(b) by 332 days.

(21) Appl. No.: 13/130,769

(22) PCT Filed: Oct. 19, 2009

(86) PCT No.: PCT/EP2009/063679
§ 371 (c)(1),
(2), (4) Date: May 24, 2011

(87) PCT Pub. No.: WO2010/060693
PCT Pub. Date: Jun. 3, 2010

(65) Prior Publication Data
US 2011/0226183 A1    Sep. 22, 2011

(30) Foreign Application Priority Data
Nov. 26, 2008    (SE) ...................................... 0802489

(51) Int. Cl.
*A01J 3/00* (2006.01)
*A01J 5/00* (2006.01)

(52) U.S. Cl.
USPC .................................... 119/14.02; 119/14.08

(58) Field of Classification Search
USPC ........... 119/14.01, 14.02, 14.47, 14.46, 14.08
See application file for complete search history.

(56) References Cited

U.S. PATENT DOCUMENTS

2007/0215052 A1    9/2007 Metcalfe et al.

FOREIGN PATENT DOCUMENTS

| DE | 41 13 700 A1 | 10/1992 |
|---|---|---|
| EP | 0 565 189 A2 | 10/1993 |
| EP | 0 655 193 A1 | 5/1995 |
| EP | 1 100 314 | 5/2001 |
| EP | 1 211 928 | 6/2002 |
| RU | 1777728 A1 | 11/1992 |
| RU | 2 143 800 C1 | 1/2000 |
| WO | 00/04766 A1 | 2/2000 |
| WO | 00/08921 A1 | 2/2000 |
| WO | 00/13491 A1 | 3/2000 |
| WO | 03/055297 A1 | 7/2003 |
| WO | 2005/122753 A1 | 12/2005 |
| WO | 2007/050012 A1 | 5/2007 |

OTHER PUBLICATIONS

International-Type Search Report, dated May 11, 2009, from corresponding PCT application.
International Search Report, dated Feb. 22, 2010, from corresponding PCT application.
Supplementary International Search Report, dated Feb. 24, 2011, from corresponding PCT application.

*Primary Examiner* — Monica Williams
(74) *Attorney, Agent, or Firm* — Young & Thompson

(57) ABSTRACT

Teat cups are fetched from a teat cup magazine by a gripper carried on a robotic arm. The gripper grips and removes teat cups from the teat cup magazine. The gripper also holds at least one teat cup during transport thereof towards an udder where an animal's teats are located. A positioning element determines position estimates representing at least one spatial characteristic of the udder. Based on the position estimates, the robotic arm and the gripper are controlled to attach the teat cups to the teats where the position estimates constitutes a basis for controlling the robotic arm and the gripper to remove teat cups from the teat cup magazine in such a manner that a teat-receiving end of the teat cup attains a horizontal level in the gripper, which horizontal level is adapted to the at least one spatial characteristic of the udder.

20 Claims, 4 Drawing Sheets

HANDLING OF TEAT CUPS

THE BACKGROUND OF THE INVENTION AND PRIOR ART

The present invention relates generally to automatic milking of animals. More particularly the invention relates to an arrangement for attaching teat cups to the teats of an animal as disclosed below.

The technical solutions for automatic milk extraction are becoming increasingly efficient and sophisticated. For example, today's milking robots allow a completely automatic milking procedure. Among other things, such a procedure involves automatic attachment of the teat cups. The prior art includes various examples of solutions for enabling and effecting this step.

EP 1 211 928 discloses a solution wherein the teat tip positions are estimated by means of light sources and image capturing means. The teat cups are then attached in response to the position estimates.

US-2007/0215052 discloses a teat location system for automatic milking installations. The system includes a light projection source and a camera capable of returning time-of-flight (TOF) information along with intensity information in two dimensions. Thus, three-dimensional data can be generated which represents imaged teats. Based thereon the teat cups can be attached in a relatively straightforward manner.

WO 2005/122753 reveals a gripper device capable of gripping and simultaneously holding two or more teat cups. By employing such a gripper device the average number of movements between the teat cup magazine and the animal's udder can be reduced, and thus the total attachment time can be shortened.

EP 1 100 314 shows a milking apparatus having a movable arm for moving teat cups towards the animal to be milked. Here, while being moved by the arm, the teat entrance end of at least one teat cup is located at a different level than the teat entrance end of a further one of the teat cups. Hence, the teat cups can be attached in a simple and reliable manner. Reattachment of any inadvertently detached teat cups is also facilitated thereby.

Although the above solutions may each have its specific qualities and advantages, there is still room to further improve the automatic attachment of teat cups. For example, as indicated above, for time efficiency it is desirable to reduce the number of times the robotic arm must move between the teat cup magazine and the udder. Therefore, grippers capable of carrying multiple teat cups are generally attractive. However, the anatomic characteristics of the udder and/or the teats may be such that if two or more teat cups are moved towards the udder in a multi-teat cup gripper, subsequent individual attachment of the teat cups is problematic because in this process the positioning means' view of the teats becomes obstructed and/or the udder and/or at least one teat interferes with the movement of the robotic arm carrying the gripper, the gripper and/or any other object mounted on the arm (e.g. an imaging means). Therefore, multi-grippers may be difficult/inefficient to employ, and sometimes even be excluded. It is also desirable to avoid the complex structure of a multi-teat cup carrier wherein the level of each teat cup is individually controllable. Moreover, the manner in which single-teat cup grippers are employed for teat cup attachment is sometimes sub-optimal from an efficiency point-of-view.

SUMMARY OF THE INVENTION

The object of the present invention is to alleviate the above problems and thus offer a more efficient, reliable and flexible solution for automatically attaching teat cups to milking animals irrespective of their udder and/or teat anatomy.

According to one aspect of the invention, the object is achieved by the initially described arrangement, wherein the control means is configured to receive the position estimates. In response thereto, the control means is configured to control the robotic arm and the gripper means to remove teat cups from the teat cup magazine in such a manner that the teat-receiving end of each of the at least one teat cup attains a horizontal level in the gripper means, which horizontal level is adapted to the at least one spatial characteristic of the udder.

This arrangement is advantageous because thereby a subsequent attachment procedure for the animal in question can be made very efficient in terms of success rate as well as the time required.

According to one preferred embodiment of this aspect of the invention, the spatial characteristics of the udder registered by the positioning means include one or more of: a respective position estimate for a tip, a center point, and/or a root of each of the teats; a respective estimate of a three-dimensional angle to the horizontal plane for each of the teats, a respective length estimate for each of the teats and a respective thickness estimate for each of the teats. Consequently, the teat cups can be arranged in the gripper means in a manner that is highly adapted to the animal's udder characteristics.

According to another preferred embodiment of this aspect of the invention, the gripper means is configured to simultaneously hold at least two teat cups during transport thereof towards the udder. The control means is further configured to control the gripper means to grip the at least two teat cups in such a manner that the teat-receiving ends thereof attain a first horizontal level relationship in the gripper means. The first horizontal level relationship is adapted to a second horizontal level relationship between the position estimates for the tips of the teats to which the at least two teat cups are to be attached. Hence, multiple teat cups can be picked up so that they are optimally arranged in the gripper means with respect to the udder characteristics of the animal in question, and the teat cups can be attached very efficiently.

According to yet another preferred embodiment of this aspect of the invention, the first horizontal level relationship is further adapted to select an order in which the at least two teat cups are to be attached to the teats based on the second horizontal level relationship. The control means is here configured to select the first horizontal level relationship, such that a transit time between removing the at least two teat cups from the teat cup magazine to attaching a last teat cup of the at least two teat cups to its intended teat is expected to become minimal. Hence, the teat-cup-attachment process can be made highly efficient.

According to still another preferred embodiment of this aspect of the invention, the positioning means is configured to generate position data representing a respective length estimate of the teats. The control means is configured to receive the position data and select the first horizontal level relationship based on a relative length of the teats, such that the teat-receiving end of a teat cup which is to be attached to a comparatively short teat attains a relatively high horizontal level in the gripper means and the teat-receiving end of a teat cup which is to be attached to a comparatively long teat attains a relatively low horizontal level in the gripper means. Consequently, the attachment procedure is further improved.

According to a further preferred embodiment of this aspect of the invention, the control means is configured to select the first horizontal level relationship based on the position estimates, such that an estimated risk is minimized that a movement of the robotic arm becomes restricted by the at least one spatial characteristic of the udder when moving the gripper means to attach the at least two teat cups to the teats. Thus, problematic udders can be specifically addressed.

According to yet another preferred embodiment of this aspect of the invention, the arrangement includes a database, and wherein the control means is configured to store the position estimates in the database. Thus, the position estimates in respect of a particular animal can be retrieved in connection with subsequent milking of the same animal, and high efficiency can be attained.

According to another aspect of the invention, the object is achieved by a milking installation configured to automatically extract milk from at least one animal, wherein the installation includes the above-described arrangement.

According to another aspect of the invention, the object is achieved by the initially described method, wherein the method comprises receiving the position estimates, and in response thereto, controlling the robotic arm and the gripper means to remove teat cups from the teat cup magazine in such a manner that the teat-receiving end of each of the at least one teat cup attains a horizontal level in the gripper means which horizontal level is adapted to the at least one spatial characteristic of the udder. The advantages of this method, as well as the preferred embodiments thereof, are apparent from the discussion hereinabove with reference to the proposed arrangement.

According to a further aspect of the invention, the object is achieved by a computer program, which is loadable into the internal memory of a computer, and includes software for controlling the above proposed method when the program is run on a computer.

According to another aspect of the invention, the object is achieved by a computer readable medium, having a program recorded thereon, where the program is to control a computer to perform the above-proposed method.

Further advantages, advantageous features and applications of the present invention will be apparent from the following description.

BRIEF DESCRIPTION OF THE DRAWINGS

The invention is now to be explained more closely by means of preferred embodiments, which are disclosed as examples, and with reference to the attached drawings.

DESCRIPTION OF PREFERRED
EMBODIMENTS OF THE INVENTION

Figure 1:
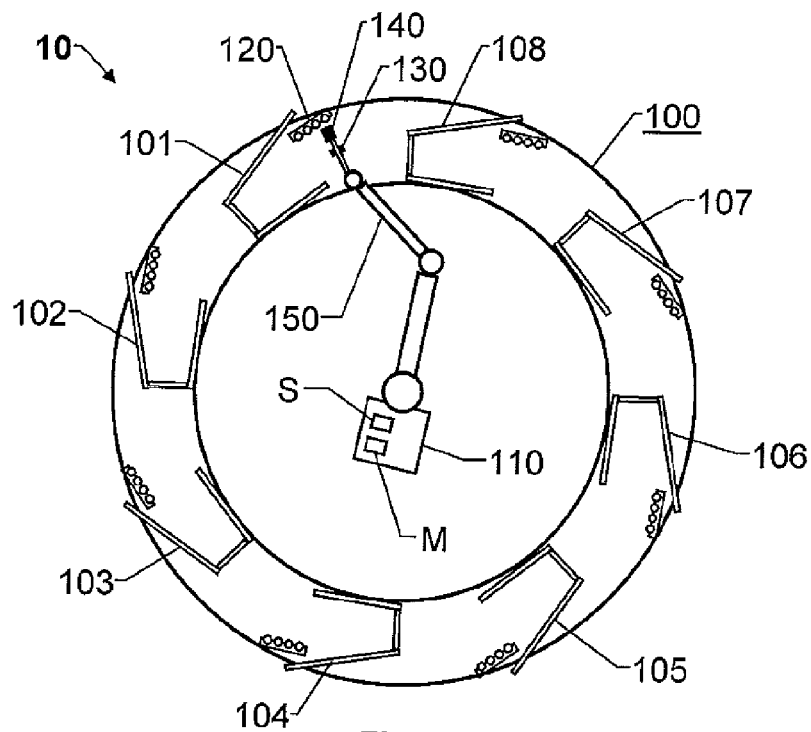
FIG. 1 schematically shows a milking installation according to one embodiment of the invention.

We refer initially to FIG. 1, which schematically shows a milking installation 10 configured to automatically extract milk from at least one milking animal, for instance a cow. To this aim, the installation 10 includes at least one milking machine (not shown). However, a teat cup magazine 120 is represented, which holds a number of teat cups, say four. The teat cups, in turn, are connected to the milking machine via one or more milk hoses (not shown). Of course, during milk extraction, the teat cups are also connected to the teats of the animal being milked.

FIG. 1 exemplifies a rotary-parlor type of milking installation 10. Nevertheless, the invention is of course applicable to all kinds of installations where teat cups are to be fetched from a teat cup magazine 120.

A robotic arm 150 carries a gripper means 140 configured to grip and remove teat cups from the teat cup magazine 120. The gripper means 140 is configured to hold at least one teat cup during transport thereof towards an udder of the animal to be milked. According to preferred embodiments of the invention, however, the gripper means 140 is configured to simultaneously hold two or more teat cups. The robotic arm 150 is preferably further configured to attach the teat cups to the animal to be milked and release the teat cups from the gripper means 140. Moreover, after that the milking has been completed, the gripper means 140 may be configured to return the teat cups to the teat cup magazine 120. Alternatively, other means may be used for this task (e.g. pneumatic or vacuum cylinders).

A control means 110 is configured to control the robotic arm 150 and the gripper means 140. Preferably, the control means 110 includes, or is associated with, a computer readable medium M, e.g. in the form of a memory module, such that the control means 110 has access to the contents of this medium M. Furthermore, a program is recorded in the computer readable medium M, and the program is adapted to make the data processor 110 control the process to be described below when the program is run on the processor 110.

Figure 2:
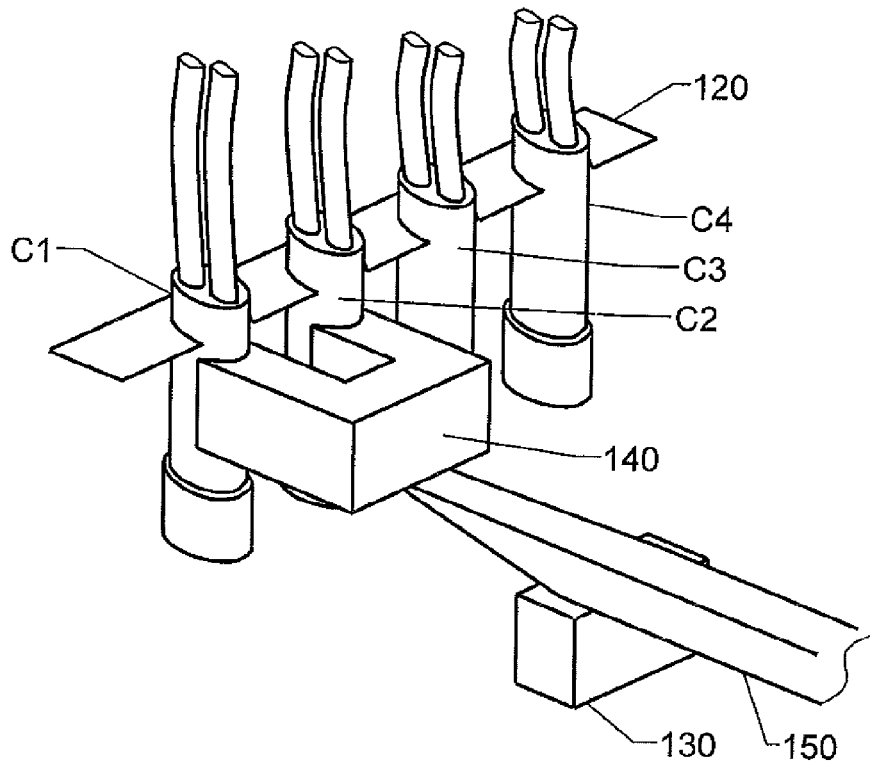
FIG. 2 shows a schematic view of a teat cup magazine and a robotic arm according to one embodiment of the invention.

Turning now to FIG. 2, we see a more detailed view of the teat cup magazine 120, a set of teat cups C1, C2, C3 and C4 respectively, the gripper means 140 according to one embodiment of the invention and a distal part of the robotic arm 150. To enable attachment of the teat cups C1, C2, C3 and C4 each teat cup has a teat-receiving end. The teat cup magazine 120 is configured to store the set of teat cups C1, C2, C3 and C4 during a non-milking state. In FIG. 2, the teat cups C1, C2, C3 and C4 are stored hanging in the teat cup magazine 120 with the teat-receiving ends pointing downwards. Naturally, any other orientation of the teat cups C1, C2, C3 and C4 in the teat cup magazine 120 is equally well conceivable according to the invention. However, the teat cup positioning shown in FIG. 2 is advantageous, since it facilitates cleaning of the teat cups C1, C2, C3 and C4, and reduces the risk that dirt and other unwanted objects enter into the teat cups C1, C2, C3 and C4.

As mentioned above, the gripper means 140 is configured to grip and remove teat cups from the teat cup magazine 120. In the embodiment illustrated in FIG. 2, the gripper means 140 is also configured to simultaneously hold two teat cups, e.g. C1 and C2, during transport thereof towards the animal to be milked. The gripper means 140 may employ different techniques to grip and hold the teat cups. For example, the teat cups C1, C2, C3 and C4 may contain a magnetic material, and the gripper means 140 may include an electromagnetic means configured to attract and seize the teat cups under the influence of a magnetic field. Alternatively, or as a complement, the gripper means 140 may include suction means and/or friction based claws. The gripper means 140 is normally also associated with a switch and/or sensor circuitry adapted to determine when the gripper means 140 has attained an adequate grip of a given teat cup. If the gripper means 140 includes an electromagnetic gripper means, an electric and/or magnetic parameter correlated with the properties of a magnetic field can be used to determine whether or not the gripper means 140 has gripped the teat cup properly.

Although the gripper means 140 may be configured to simultaneously hold two or more teat cups (such as C1 and C2 in FIG. 2), the gripper means 140 is adapted to grip and remove each teat cup separately from the teat cup magazine 120. Preferably, the gripper means 140 is likewise adapted to release the teat cups separately after having been attached to the intended teats. The robotic arm 150 carries the gripper means 140, and is configured to transport the gripper means 140 between the teat cup magazine 120 and the teats to which the teat cups C1, C2, C3 and C4 are to be attached.

If, as is the case in FIG. 2, the teat cup magazine 120 stores the teat cups C1, C2, C3 and C4 oriented with their teat-receiving ends pointing in a non-upward direction, the robotic arm 150 must turn each teat cup such that its teat-receiving end points upward before the teat cup reaches the teat to which the teat cup is to be attached. For example, this may be performed by rotating the distal part of the robotic arm 150 around its own axis.

FIG. 2 additionally shows a positioning means 130, which is configured to determine position estimates representing at least one spatial characteristic of an udder where the teats are located to which the teat cups are to be attached. For example the spatial characteristics of the udder may include a respective position estimate for a tip, a center point, and/or a root of each teat. Additionally, or alternatively, the spatial characteristics may include a respective estimate of a three-dimensional angle to the horizontal plane for each of the teats. Moreover, alternatively, or as a complement thereto, the spatial characteristics may include a respective length estimate for the teats and/or a respective thickness estimate for each of the teats. Further details concerning the spatial characteristics of the udder will be discussed below with reference to FIGS. 3, 5, 6 and 7.

In order to determine the spatial characteristics of the udder, the positioning means 130 registers reflected wireless energy. For instance, the positioning means 130 may therefore include one or more of laser source(s) and laser detector(s), imaging device(s) (of conventional and/or of the above-mentioned TOF type), radar(s) and sonar(s). The positioning means 130 is preferably arranged on the robotic arm 150. However, alternatively, the positioning means 130 may be separated from the robotic arm 150, and for example be located on stand in proximity to the expected udder position. A stationary positioning means 130 is advantageous because it allows position estimates to be registered already when the animal enters the milking box. Nevertheless, one advantage with arranging the positioning means 130 on the robotic arm 150 is that the positioning means 130 may be used in a straightforward manner also to control the robotic arm 150 and its gripper means 140 towards the relevant teat cups in the teat cup magazine 120. Moreover, it is possible to avoid occlusion by moving the positioning means 130 to different viewpoints.

Figure 3:
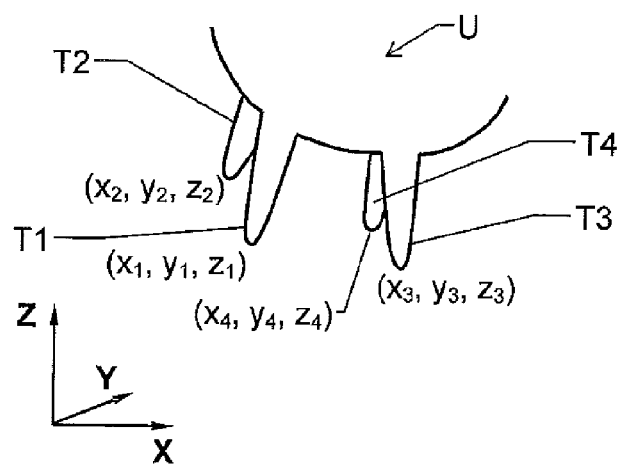
FIG. 3 exemplifies an udder and shows spatial coordinates for the tips of its teats.

FIG. 3 shows an exemplifying udder U to whose teats T1, T2, T3 and T4 respectively the teat cups C1, C2, C3 and C4 are to be attached. The tip of each teat T1, T2, T3 and T4 has a particular spatial coordinate $(x_1, y_1, z_1)$, $(x_2, y_2, z_2)$, $(x_3, y_3, z_3)$ and $(x_4, y_4, z_4)$ respectively in a coordinate system X, Y, Z. According to one embodiment of the invention, the positioning means 130 is configured to determine a respective estimate of the teat tip positions $(x_1, y_1, z_1)$, $(x_2, y_2, z_2)$, $(x_3, y_3, z_3)$ and $(x_4, y_4, z_4)$. Thus, these position estimates may be included in the representation of the spatial characteristics of the udder U. As mentioned above, the positioning means 130 is configured to determine position estimates of various other spatial characteristics of the udder U. Irrespective of which specific parameters are included in the spatial characteristics of the udder U, it is preferable to update the position estimates repeatedly in order to improve the data quality and to enable adaption to any changes in the spatial characteristics of the udder U. Additionally, it is advantageous if the control means 110 is configured to store the respective udder characteristics of each animal in a database S, such that the data can be retrieved in connection with subsequent milking of the same animal. As a result, the efficiency of the teat-cup attachment can be further improved.

Figure 4A:
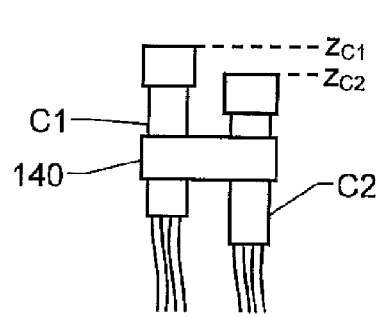
FIGS. 4a-c show examples of multi-grippers according to embodiments of the invention, and illustrates how the teat cups therein may be arranged at different horizontal levels.

The control means 110, in turn, is configured to control the robotic arm 150 and the gripper means 140 to remove a number of the teat cups C1, C2, C3 and C4 from the teat cup magazine 120, receive the position estimates $(x_1, y_1, z_1)$, $(x_2, y_2, z_2)$, $(x_3, y_3, z_3)$ and $(x_4, y_4, z_4)$, and in response thereto control the robotic arm 150 and the gripper means 140 to attach the teat cups to each teat in a given set of the udder's U teats, say T1 and T3. Hence, based on information describing the morphology of the udder U, the control means 110 controls the gripper means 140 to grip at least one teat cup. As mentioned above, in each go, the gripper means 140 may either transport a single teat cup, or simultaneously carry multiple teat cups between the teat cup magazine 120 and the udder U. Also in case the gripper means 140 carries a single teat cup to the udder U for attachment, the udder morphology may determine what constitutes an appropriate level to grip the teat cup relative to its teat-receiving end. For example, in order to avoid hitting the udder U and/or its teat, when gripping a first teat cup to be attached to a first teat, a spatial relationship between the first teat and at least one second teat may influence the horizontal level at which the first teat cup shall be gripped relative to its teat-receiving end, even if the teat cup(s) to be attached to the at least one second teat will be fetched from the teat cup magazine 120 at a later stage. Referring further to FIG. 4a, according to one embodiment of the invention, the control means 110 is specifically configured to control the gripper means 140 to grip two teat cups, say C1 and C2, in such a manner that the teat-receiving ends thereof attain a first horizontal level relationship in the gripper means 140. FIG. 4a shows that the teat-receiving end of a first teat cup C1 has a first horizontal level $z_{C1}$ and that the teat-receiving end of a second teat cup C2 has a second horizontal level $z_{C2}$. As can be seen, the first level $z_{C1}$ is above the second level $z_{C2}$, and the teat-receiving ends of the teat cups C1 and C2 point upwards. Of course, if the teat cup magazine 120 stores the teat cups C1 and C2 with their teat-receiving ends pointing downwards, the relationship between $z_{C1}$ and $z_{C2}$ is the opposite when gripper means 140 grips the teat cups C1 and C2 and removes them from the teat cup magazine 120. In any case, the first horizontal level relationship between the first and second levels $z_{C1}$ and $z_{C2}$ respectively is adapted to a second horizontal level relationship between the position estimates for the tips of the teats T1 and T3 to which the teat cups C1 and C2 are to be attached. In this example, the teat T1 is estimated to be positioned at a first horizontal level $z_1$ and the teat T3 is estimated to be positioned at a second horizontal level $z_3$ that is somewhat below the first horizontal level $z_1$. Prima facie, this renders the arrangement of the teat cups C1 and C2 in the gripper means 140 adapted to the teats T1 and T3, if the first teat cup C1 is to be attached to the teat T1, the second teat cup C2 is attached to the teat T3, and the first teat cup C1 is attached before the second teat cup C2. According to one embodiment of the invention, the first horizontal level relationship is adapted to the order in which the teat cups C1 and C2 in the gripper means 140 are to be attached to designated teats, i.e. in this example T1 and T3. The control means 110 selects the first horizontal level relationship, such that a transit time between removing the teat cups C1 and C2 from the teat cup magazine 120 to attaching a last teat cup, here C2, to its intended teat, here T3, is expected to become minimal.

However, as will be discussed below with reference to FIGS. 5 6 and 7, if additional information is known about the udder U and/or its teats T1 and T3 and/or if the direction in which the gripper means 140 approaches the udder U is different, or is variable, another relationship between the levels $z_{C1}$ and $z_{C2}$ and/or the order in which the teat cups C1 and C2 are attached may prove to be superior.

Figure 4B:
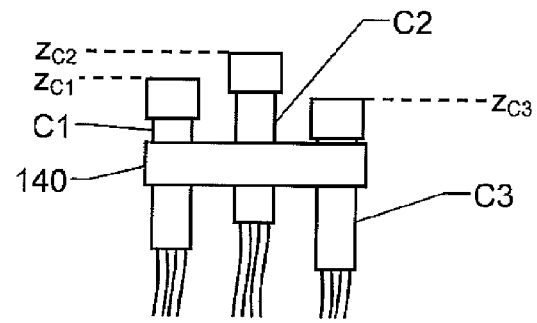
Figure 4C:
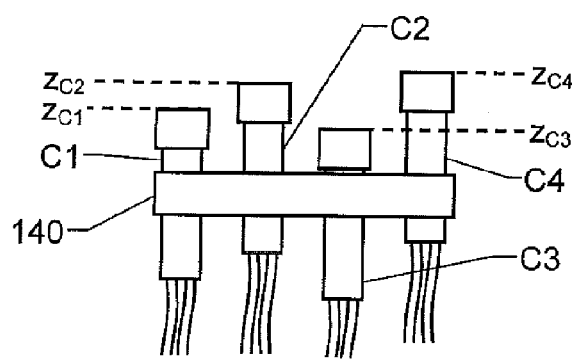

FIGS. 4b and 4c show gripper means 140 according to embodiments of the invention, which gripper means 140 are configured to simultaneously carry three and four teat cups respectively. Analogous to the discussion above with reference to FIG. 4a, each gripper means 140 is configured to grip the teat cups in such a manner that the teat-receiving ends thereof attain a first horizontal level relationship in the gripper means 140, which first horizontal level relationship is adapted to a second horizontal level relationship between the position estimates for the tips of the teats to which the teat cups are to be attached. In FIG. 4b this means that the teat-receiving end of a first teat cup C1 is located at a first horizontal level $z_{C1}$, the teat-receiving end of a second teat cup C2 is located at a second horizontal level $z_{C2}$ and the teat-receiving end of a third teat cup C3 is located at a third horizontal level $z_{C3}$; and in FIG. 4c the teat-receiving end of a first teat cup C1 is located at a first horizontal level $z_{C1}$, the teat-receiving end of a second teat cup C2 is located at a second horizontal level $z_{C2}$, the teat-receiving end of a third teat cup C3 is located at a third horizontal level $z_{C3}$ and the teat-receiving end of a fourth teat cup C4 is located at a third horizontal level $z_{C4}$.

As can be seen, each teat cup C1, C2, C3 or C4 can be positioned in the gripper means 140 at arbitrary horizontal level in a range, which is essentially equal to the extension of the teat cup shell.

Figure 5:
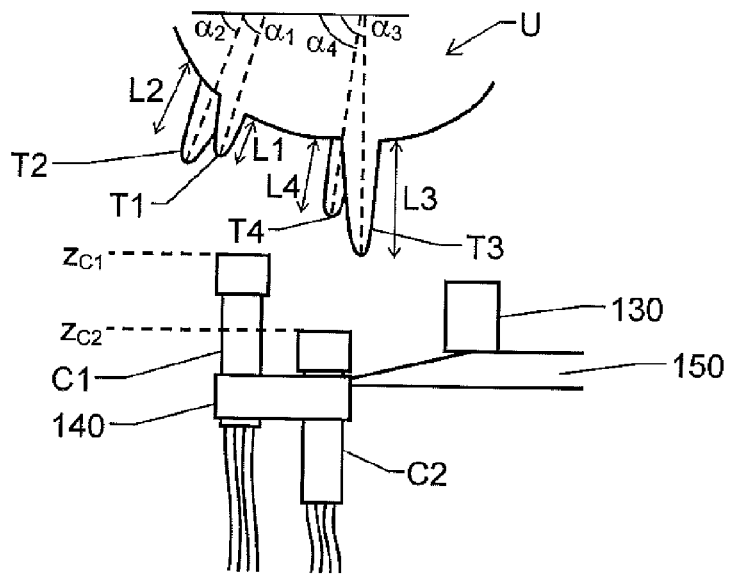
FIG. 5 exemplifies an udder and illustrates anatomic parameters thereof, which may be employed according to embodiments of the invention in order to determine an appropriate horizontal level relationship between the teat cups in the gripper means.

FIG. 5 shows an example of an udder U having teats T1, T2, T3 and T4. A first teat T1 has a first length L1 and a first three-dimensional angle $\alpha_1$ to the horizontal plane; a second teat T2 has a second length L2 and a second three-dimensional angle $\alpha_2$ to the horizontal plane; a third teat T3 has a third length L3 and a third three-dimensional angle $\alpha_3$ to the horizontal plane; and a fourth teat T4 has a fourth length L4 and a fourth three-dimensional angle $\alpha_4$ to the horizontal plane. Although not explicitly shown in FIG. 5, each teat T1, T2, T3 and T4 also has a respective thickness (or average diameter), which may influence the teat cup attachment. Hence, the thicknesses, the lengths L1, L2, L3, L4, the angles $\alpha_1$, $\alpha_2$, $\alpha_3$ and $\alpha_4$ are parameters that designate spatial characteristics of the udder U, and these parameters in turn, determine how a set of teat cups should be attached to the teats T1, T2, T3 and T4 respectively via a gripper means 140.

According to one embodiment of the invention, the positioning means 130 is configured to generate position data representing the respective lengths L1, L2, L3 and L4 of the teats T1, T2, T3 and T4. The control means 110 is configured to receive this position data, and based thereon select the first horizontal level relationship, such that the teat-receiving end of a teat cup which is to be attached to a comparatively short teat attains a relatively high horizontal level in the gripper means 140 and the teat-receiving end of a teat cup which is to be attached to a comparatively long teat attains a relatively low horizontal level in the gripper means 140. In particular, it is desirable to position the teat cup at a relatively high horizontal level in the gripper means 140 when attaching a teat cup to a relatively short teat because thereby the risk of hitting the udder U with the positioning means 130 during the attachment procedure decreases.

Assuming that a first teat cup C1 is to be attached to the first teat T1 and that a second teat cup C2 is to be attached to the third teat T3, this means that in the example illustrated in FIG. 5 the teat-receiving end of the first teat cup C1 is arranged at a relatively high level $z_{C1}$ in the gripper means 140 and the second teat cup C2 is arranged at a relatively low level $z_{C2}$ in the gripper means 140. Normally, it is also advantageous if the most elevated teat cup (i.e. here C1) is attached first.

However, if for example the difference between the levels $z_{C1}$ and $z_{C2}$ is comparatively small, and the udder anatomy is such that the positioning means 130 risks interfering with the udder U, it may instead be preferable to attach the teat cups C1 and C2 in a different order.

Therefore, according to one embodiment of the invention, the positioning means 130 is configured to register data representing at least one spatial characteristic of the udder U in addition to the above-mentioned data, e.g. the udder's U extension at various levels in front of, behind, on the sides of and/or between the teats T1, T2, T3 and T4. The control means 110 is configured to receive the spatial data and based thereon select the first horizontal level relationship, such that an estimated risk is minimized that a movement of the robotic arm 150 becomes restricted by the at least one spatial characteristic of the udder U when moving the gripper means 140 to attach the teat cups to teats thereof. Naturally, the movement of the robotic arm 150 may be restricted due to various reasons, for example because of the geometric properties of the arm itself, or any device attached thereto (or even the teat cups) are such that these structures interfere with the udder U and/or with at least one of the teats T1, T2, T3 or T4.

The three-dimensional angles $\alpha_1$, $\alpha_2$, $\alpha_3$ and $\alpha_4$ for the teats T1, T2, T3 and T4 respectively may also influence the first horizontal level relationship and the most suitable attachment order. For example, if the tips of two or more teats are located at essentially the same horizontal level, it is normally advantageous to attach a teat cup to the most inclined teat first. Namely, if this teat becomes further tilted when attaching teat cups to the other teats, there is an increased risk for attachment failure (e.g. involving folding the teat inside the teat cup) regarding the teat.

Figure 6:
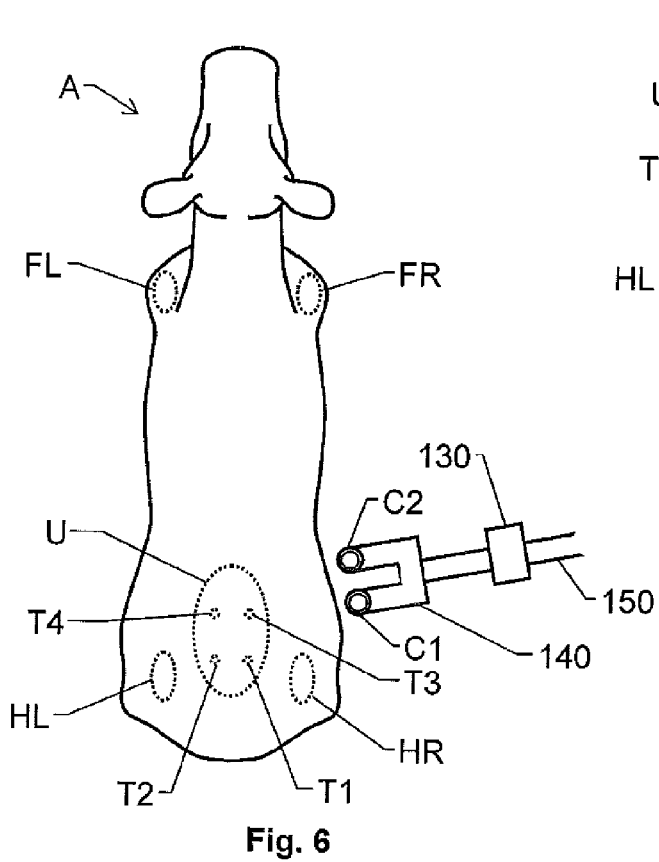
FIG. 6 shows a first example of how the robotic arm and the gripper means may attach teat cups to a milking animal according to an embodiment of the invention.

FIG. 6 shows how the robotic arm 150 and the gripper means 140 may be used to attach a pair of teat cups C1 and C2 to designated teats of a milking animal A according to one embodiment of the invention. Here, the robotic arm 150 approaches the animal A from the side in front of the hind legs HL and HR and behind the front legs FL and FR, i.e. as is the case for the milking installation shown in FIG. 1.

Generally, in such a case, in order to minimize the risk of milk hose entanglement, it is advantageous to attach teat cups to the rear teats first. Thus, when the robotic arm 150 approaches the animal A for the first time, a first teat cup C1 may be attached to a first teat T1 and a second teat cup C2 may be attached to a second teat T2. Then, in a second round, a third teat cup may be attached to a third teat T3 and a fourth teat cup may be attached to a fourth teat T4 in a front row of the udder U. However, as discussed above, any other attachment order may prove more efficient depending on the anatomic characteristics of the udder U and its teats T1, T2, T3 and T4.

Figure 7:
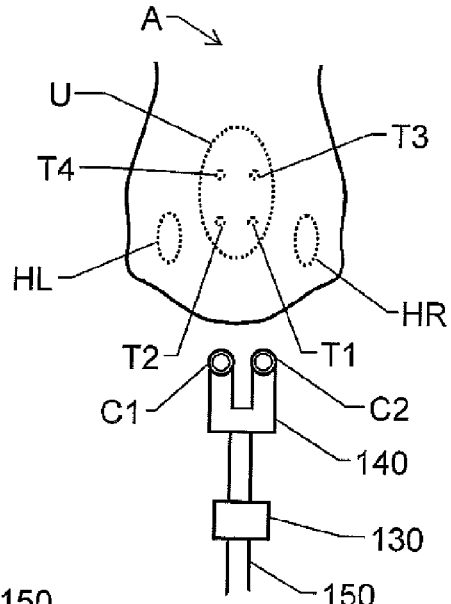
FIG. 7 shows a second example of how the robotic arm and the gripper means may attach teat cups to a milking animal according to an embodiment of the invention.

FIG. 7 shows an embodiment of the invention where the robotic arm 150 instead approaches the animal A from behind, i.e. between the hind legs HL and HR. Here, the attachment order for the teat cups C1 and C2 may be determined entirely based on the anatomic characteristics of the udder U and its teats T1, T2, T3 and T4 of the animal A in question as described above.

Figure 8:
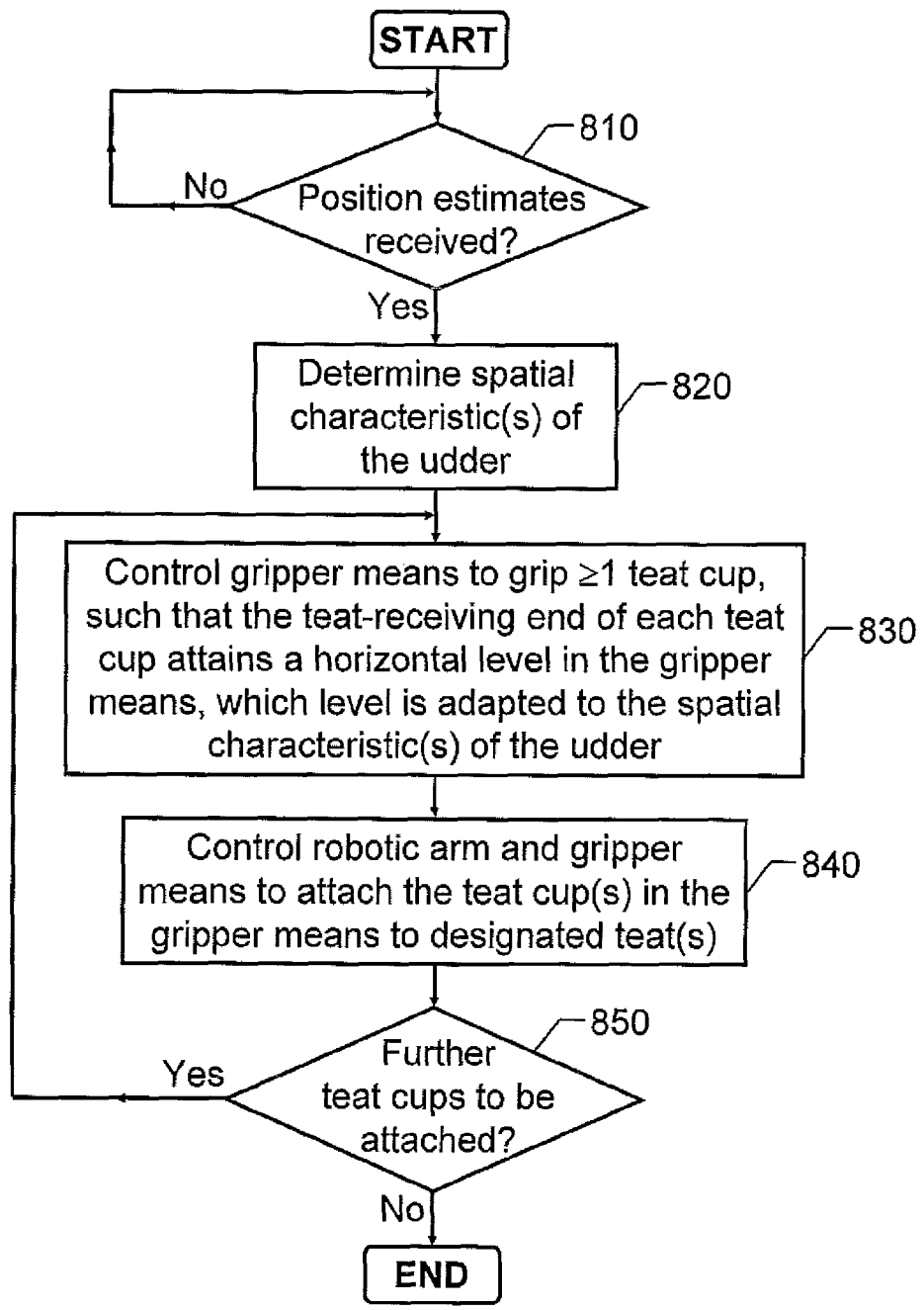
FIG. 8 illustrates, by means of a flow diagram, the general method according to the invention.

In order to sum up, we will now describe the general method according to the invention with reference to the flow diagram in FIG. 8.

A first step 810 checks whether or not the control means has received any position estimates in respect of the udder to whose teats teat cups are to be attached. If no such estimates have been received, the procedure loops back and stays in step 810. If an automatic procedure is available for teaching the system relevant teat positions, such a procedure may be employed to acquire the position estimates in step 810. In any case, when position estimates have been received, the procedure continues to step 820, which determines at least one spatial characteristic of the udder. Then, a step 830 controls the gripper means to grip at least one teat cup in such a manner that the teat-receiving end of each teat cup attains a horizontal level in the gripper means, which level is adapted to the at least one spatial characteristic of the udder to whose teats the at least one teat cup is to be attached.

Subsequently, a step 840 controls the robotic arm to move towards the animal's udder while carrying the at least one teat cup, and controls the gripper means in such a manner that each teat cup in the gripper means is attached to a designated teat of the udder in a given order. Preferably, during this process, the positioning means continues to produce updated position estimates for the teat tips, and further preferably also for other relevant anatomic features of the udder.

Finally, after having attached each teat cup carried by the griper means, a step 850 checks if further teat cups are to be attached. If so, the procedure loops back to step 830 and otherwise the procedure ends. Generally, if attachment and subsequent milking is considered to have been completed successfully, updated position estimates are preferably stored in the database S.

All of the process steps, as well as any sub-sequence of steps, described with reference to FIG. 8 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention primarily is intended to be utilized in connection with cow milking, the invention is equally well adapted for testing milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia, or any other country.

The invention is not restricted to the described embodiments in the figures, but may be varied freely within the scope of the claims.

The invention claimed is:

1. An arrangement for attaching teat cups (C1, C2, C3, C4) to the teats (T1, T2, T3, T4) of a milking animal (A), each teat cup having a teat-receiving end configured to receive one teat of the animal (A), the arrangement comprising:

a teat cup magazine (120) that stores teat cups (C1, C2, C3, C4);

a gripper element (140) that grips and removes the teat cups (C1, C2, C3, C4) from the teat cup magazine (120) and holds at least one removed teat cup (C1, C2) during transport thereof towards an udder (U) where the teats (T1, T2, T3, T4) are located;

a robotic arm (150) carrying the gripper element and configured to transport the gripper element, gripping the at least one teat cup, between the teat cup magazine and the teats;

a positioning element (130) that determines position estimates representing at least one spatial characteristic of the udder; and a control element (110) that a) receives the determined position estimates, and b) after receiving the position estimates, controls the robotic arm and the gripper element to i) grip the at least one teat cup in the teat cup magazine, and ii) attach the gripped at least one teat cup to one of the teats, wherein the control element i) based on the at least one spatial characteristic of the udder represented by the received position estimates, determines a horizontal level ($z_{C1}$, $z_{C2}$) to grip the at least one teat cup, the horizontal level being determined relative to the at least one teat cup's teat-receiving end, and ii) controls the robotic arm and the gripper element so that the gripper element grips the at least one teat cup in the teat cup magazine at the determined horizontal level, and the gripper element removes the at least one teat cup from the teat cup magazine with the at least one teat cup gripped in the gripper element at the determined horizontal level relative to the a least one teat cup's teat-receiving end.

2. The arrangement according to claim 1, wherein, the control element (110)
a) receives the determined position estimates from the positioning element representing plural spatial characteristics of the udder, and
b) after receiving the position estimates, controls the robotic arm and the gripper element to i) grip two of the teat cups in the teat cup magazine, and ii) attach the two gripped teat cups to two of the teats,
wherein the control element
i) based on the plural spatial characteristics of the udder represented by the received position estimates, determines two different respective horizontal levels ($z_{C1}$, $z_{C2}$), relative to the two teat cup's teat-receiving ends, to grip the two teat cups, and
ii) controls the robotic arm and the gripper element i) to grip a first of the two teat cups in the teat cup magazine at a first of the two determined horizontal levels and to grip a second of the two teat cups in the teat cup magazine at a second of the two determined horizontal levels, and ii) removes the two teat cups from the teat cup magazine with the two teat cups gripped in the gripper element at the two respective determined horizontal levels relative to the two teat cup's teat-receiving end.

3. The arrangement according to claim 1, wherein the at least one spatial characteristic of the udder (U) includes at least one of:
i) a respective three-dimension position estimate ($x_1$, $y_1$, $z_1$; $x_2$, $y_2$, $z_2$; $x_3$, $y_3$, $z_3$; $x_4$, $y_4$, $z_4$) for a tip, a center point, and/or a root of each of the teats (T1, T2, T3, T4),
ii) a respective estimate of a three-dimensional angle ($\alpha_1$, $\alpha_2$, $\alpha_3$, $\alpha_4$) to the horizontal plane for each of the teats (T1, T2, T3, T4),
iii) a respective length estimate (L1, L2, L3, L4) for each of the teats (T1, T2, T3, T4), and
iv) a respective thickness estimate for each of the teats (T1, T2, T3, T4).

4. The arrangement according to claim 1, wherein
the gripper element (140) simultaneously holds at least two teat cups (C1, C2) during trans-port thereof towards the udder (U),
the positioning element (130) determines a respective three-dimension position estimate ($x_1$, $y_1$, $z_1$; $x_2$, $y_2$, $z_2$; $x_3$, $y_3$, $z_3$; $x_4$, $y_4$, $z_4$) for a tip of each of the teats (T1, T2, T3, T4), and
the control element (110) receives the position estimates ($x_1$, $y_1$, $z_1$; $x_2$, $y_2$, $z_2$; $x_3$, $y_3$, $z_3$; $x_4$, $y_4$, $z_4$) and in response thereto control the gripper element (140) to grip the at least two teat cups (C1, C2) in such a manner that the teat-receiving ends thereof attain a first horizontal level relationship ($z_{C1}$, $z_{C2}$) in the gripper element (140), which first horizontal level relationship ($z_{C1}$, $z_{C2}$) is adapted to a second horizontal level relationship ($z_1$, $z_3$) between the position estimates for the tips of the teats (T1, T3) to which the at least two teat cups (C1, C2) are to be attached.

5. The arrangement according to claim 4, wherein, the first horizontal level relationship ($z_{C1}$, $z_{C2}$) selects an order in which the at least two teat cups (C1, C2) are to be attached to the teats (T1, T3) based on the second horizontal level relationship ($z_1$, $z_3$), and
the control element (110) selects the first horizontal level relationship ($z_{C1}$, $z_{C2}$) such that a transit time between removing the at least two teat cups (C1, C2) from the teat cup magazine (120) to attaching a last teat cup (C2) of the at least two teat cups (C1, C2) to an intended teat (T3) of the teats (T1, T3) is expected to become minimal.

6. The arrangement according to claim 4, wherein,
the positioning element (130) generates position data representing a respective length estimate (L1, L2, L3, L4) of the teats (T1, T2, T3, T4), and
the control element (110) receives the position data and selects the first horizontal level relationship ($z_{C1}$, $z_{C2}$) based on a relative length of the teats such that the teat-receiving end of a teat cup (C1) which is to be attached to a comparatively short teat (T1) attains a relatively high horizontal level ($z_{C1}$) in the gripper element (140) and the teat-receiving end of a teat cup (C2) which is to be attached to a comparatively long teat (T3) attains a relatively low horizontal level ($z_{C2}$) in the gripper element (140).

7. The arrangement according to claim 4, wherein the control element (110) selects the first horizontal level relationship ($z_{C1}$, $z_{C2}$) based on the position estimates such that an estimated risk is minimized that a movement of the robotic arm (150) becomes restricted by the at least one spatial characteristic of the udder (U) when moving the gripper element (140) to attach the at least two teat cups (C1, C2) to the teats (T1, T3).

8. The arrangement according to claim 1, further comprising:
a database (S) that stores the position estimates from the positioning element,
wherein the control element receives the position estimates stored in the database such that the position estimates in respect of a particular animal (A) can be retrieved in connection with subsequent milking of the same animal (A).

9. The arrangement according to claim 1, located within a milking installation (10) and configured to automatically extract milk from at least one animal (A).

10. The arrangement according to claim 1, wherein,
the horizontal level ($z_{C1}$, $z_{C2}$) is based on the at least one spatial characteristic of the udder (U) represented by the position estimates to avoid hitting the udder during attachment of the at least one teat cup to the teat.

11. A method of attaching cups (C1, C2, C3, C4) to the teats (T1, T2, T3, T4) of a milking animal (A), each teat cup having a teat-receiving end configured to receive one teat of the animal (A), the method comprising:
using a control element (120), receiving position estimates representing at least one spatial characteristic of the udder (U);
with the control element, controlling a gripper element (140) to grip and remove teat cups from a teat cup magazine (120) in which the teat cups (C1, C2, C3, C4) are stored;
with the control element, controlling the gripper element (140) to hold at least one teat cup (C1, C2) during transport thereof towards an udder (U) where the teats (T1, T2, T3, T4) are located; and
with the control element, controlling a robotic arm (150) carrying the gripper element (140) to transport the gripper element (140), gripping the at least one teat cup (C1, C2), between the teat cup magazine (120) and the teats (T1, T2, T3, T4),
wherein in said step of controlling the gripper element to grip and remove teat cups from a teat cup magazine, the robotic arm and the gripper element are controlled, based on the position estimates, to have the gripper element grip the at least one teat cup, located in the teat cup magazine, at a determined level of the at least one teat cup, in such a manner that the teat-receiving end of the at least one teat cup is gripped at a horizontal level ($z_{C1}$, $z_{C2}$) in the gripper element, which horizontal level ($z_{C1}$, $z_{C2}$) is based on the at least one spatial characteristic of the udder (U) represented by the position estimates.

12. The method according to claim 11, wherein the at least one spatial characteristic of the udder (U) includes at least one of:
   i) a respective three-dimension position estimate ($x_1$, $y_1$, $z_1$; $x_2$, $y_2$, $z_2$; $x_3$, $y_3$, $z_3$; $x_4$, $y_4$, $z_4$) for a tip, a center point, and/or a root of each of the teats (T1, T2, T3, T4),
   ii) a respective estimate of a three-dimensional angle ($\alpha_1$, $\alpha_2$, $\alpha_3$, $\alpha_4$) to the horizontal plane for each of the teats (T1, T2, T3, T4),
   iii) a respective length estimate (L1, L2, L3, L4) for each of the teats (T1, T2, T3, T4), and
   iv) a respective thickness estimate for each of the teats (T1, T2, T3, T4).

13. The method according to claim 11, wherein,
   the gripper element (140) is configured to simultaneously hold at least two teat cups (C1, C2) during transport thereof towards the udder (U),
   the positioning estimates represent a respective three-dimension position estimate ($x_1$, $y_1$, $z_1$; $x_2$, $y_2$, $z_2$; $x_3$, $y_3$, $z_3$; $x_4$, $y_4$, $z_4$) for a tip of each of the teats (T1, T2, T3, T4), and the method further comprises:
   receiving the three-dimension position estimates ($x_1$, $y_1$, $z_1$; $x_2$, $y_2$, $z_2$; $x_3$, $y_3$, $z_3$; $x_4$, $y_4$, $z_4$); and
   in response to the three-dimension position, controlling the gripper element (140) to grip the at least two of the teat cups (C1, C2) in such a manner that the teat-receiving ends thereof attain a first horizontal level relationship ($z_{C1}$, $z_{C2}$) in the gripper element (140), which first horizontal level relationship ($z_{C1}$, $z_{C2}$) is adapted to a second horizontal level relationship ($z_1$, $z_3$) between the position estimates for the tips of the teats (T1, T3) to which the at least two teat cups (C1, C2) are to be attached.

14. The method according to claim 13, wherein the method further comprises:
   selecting an order in which the at least two teat cups (C1, C2) are to be attached to the teats (T1, T3) based on the second horizontal level relationship; and
   selecting the first horizontal level relationship ($z_{C1}$, $z_{C2}$) such that a transit time between removing the at least two teat cups (C1, C2) from the teat cup magazine (120) to attaching a last teat cup (C2) of the at least two teat cups (C1, C2) to its intended teat (T3) of the teats (T1, T3) is expected to become minimal.

15. The method according to claim 13, wherein,
   the position estimates further represent a respective length estimate (L1, L2, L3, L4) of the teats (T1, T2, T3, T4), and
   the method further comprises selecting the first horizontal level relationship ($z_{C1}$, $z_{C2}$) based on a relative length of the teats (T1, T2, T3, T4) such that the teat-receiving end of a teat cup (C1) which is to be attached to a comparatively short teat (T1) attains a relatively high horizontal level ($z_{C1}$) in the gripper element (140), and the teat-receiving end of a teat cup (C2) which is to be attached to a comparatively long teat (T3) attains a relatively low horizontal level ($z_{C2}$) in the gripper element (140).

16. The method according to claim 13, wherein the method further comprises:
   selecting the first horizontal level relationship ($z_{C1}$, $z_{C2}$) based on the spatial data such that an estimated risk is minimized that a movement of the robotic arm (150) becomes restricted by the at least one spatial characteristic of the udder (U) when moving the gripper element (140) to attach the at least two teat cups (C1, C2) to the teats (T1, T3).

17. The method according to claim 11, wherein the method further comprises:
   storing the position estimates in a database (S) in such a manner that the position estimates in respect of a particular animal (A) can be retrieved in connection with subsequent milking of the same animal (A).

18. The method according to claim 11, wherein,
   the horizontal level ($z_{C1}$, $z_{C2}$) is based on the at least one spatial characteristic of the udder (U) represented by the position estimates to avoid hitting the udder during attachment of the at least one teat cup to the teat.

19. A non-transitory computer readable medium (M) with a computer-executable program recorded thereon, when executed on a control computer, the program causing the control computer to control a method of attaching cups (C1, C2, C3, C4) to the teats (T1, T2, T3, T4) of a milking animal (A), each teat cup having a teat-receiving end configured to receive one teat of the animal (A), by the control computer executing the steps of:
   receiving position estimates representing at least one spatial characteristic of the udder (U);
   controlling a gripper element (140) to grip and remove teat cups from a teat cup magazine (120) in which the teat cups (C1, C2, C3, C4) are stored;
   controlling the gripper element (140) to hold at least one teat cup (C1, C2) during transport thereof towards an udder (U) where the teats (T1, T2, T3, T4) are located; and
   controlling a robotic arm (150) carrying the gripper element (140) to transport the gripper element (140), gripping the at least one teat cup (C1, C2), between the teat cup magazine (120) and the teats (T1, T2, T3, T4),
   wherein in said step of controlling the gripper element to grip and remove teat cups from a teat cup magazine, the robotic arm and the gripper element are controlled, based on the position estimates, to have the gripper element grip the at least one teat cup, located in the teat cup magazine, at a determined level of the at least one teat cup, in such a manner that the teat-receiving end of the at least one teat cup is gripped at a horizontal level ($z_{C1}$, $z_{C2}$) in the gripper element, which horizontal level ($z_{C1}$, $z_{C2}$) is based on the at least one spatial characteristic of the udder (U) represented by the position estimate,
   wherein in said step of controlling the gripper element to grip and remove teat cups from a teat cup magazine, the robotic arm and the gripper element are controlled, based on the position estimates, to have the gripper element grip the at least one teat cup, located in the teat cup magazine, at a determined level of the at least one teat cup, in such a manner that the teat-receiving end of the at least one teat cup is gripped at a horizontal level ($z_{C1}$, $z_{C2}$) in the gripper element, which horizontal level ($z_{C1}$, $z_{C2}$) is based on the at least one spatial characteristic of the udder (U) represented by the position estimates.

20. The non-transitory computer readable medium (M) according to claim 19, wherein,
   the horizontal level ($z_{C1}$, $z_{C2}$) is based on the at least one spatial characteristic of the udder (U) represented by the position estimates to avoid hitting the udder during attachment of the at least one teat cup to the teat.

* * * * *